United States Patent [19]
McCabe

[11] Patent Number: 5,600,094
[45] Date of Patent: Feb. 4, 1997

[54] FIXING DEVICE TO ANCHOR AND SEAL AN ELONGATE MEMBER

[76] Inventor: Neil E. McCabe, 41 Kebbell Grove, Lower Hutt, New Zealand

[21] Appl. No.: 446,606

[22] PCT Filed: Nov. 25, 1993

[86] PCT No.: PCT/NZ93/00118

§ 371 Date: May 26, 1995

§ 102(e) Date: May 26, 1995

[87] PCT Pub. No.: WO94/12821

PCT Pub. Date: Jun. 9, 1994

[30] Foreign Application Priority Data

Nov. 30, 1992 [NZ] New Zealand .................... 245311

[51] Int. Cl.$^6$ .................................................. H02G 3/18
[52] U.S. Cl. ...................................... 174/65 SS; 285/323
[58] Field of Search .................. 174/65 SS; 285/322, 285/323, 158

[56] References Cited

U.S. PATENT DOCUMENTS

| | | | |
|---|---|---|---|
| 3,055,972 | 9/1962 | Peterson | 174/151 |
| 4,145,075 | 3/1979 | Holzmann | 285/81 |
| 4,767,135 | 8/1988 | Holzmann | 285/27 |
| 4,787,657 | 11/1988 | Henniger | 285/323 |
| 5,048,872 | 9/1991 | Gehring | 285/92 |
| 5,350,204 | 9/1994 | Henniger | 285/323 |

FOREIGN PATENT DOCUMENTS

| | | | |
|---|---|---|---|
| 1828483 | 3/1984 | Australia | F16L 19/06 |
| 0121747 | 3/1984 | European Pat. Off. | H02G 3/06 |
| 0528233 | 7/1992 | European Pat. Off. | F16L 19/06 |
| 3104974 | 2/1981 | Germany | F16L 5/02 |
| 4127162 | 8/1991 | Germany | H02G 3/06 |

*Primary Examiner*—Hyung S. Sough
*Assistant Examiner*—Dean A. Reichard
*Attorney, Agent, or Firm*—Volpe and Koenig, P.C.

[57] ABSTRACT

This invention relates to a fixing device of the kind generally known as a cable gland for anchoring and sealing around a filamentary product such as an electrical cable. The device comprises a body, an annular cap, a clamping ring, and an elastomeric sealing sleeve. The body has a central bore extending its entire length, and is provided with a screw-threaded end portion. The annular cap includes an urging structure, and is threadably mountable on the screw-threaded end portion of the body. The clamping ring includes an annular base member upstanding from which extend a plurality of spaced apart gripping fingers. The sealing sleeve is adapted to be slidably received within the annulus of gripping fingers but to extend outwardly beyond the tips thereof. On insertion the free ends of the fingers slidably engage an inwardly tapered portion of the bore, and the urging structure can act to urge the free ends of the fingers into the tapered portion. The free ends are configured and arranged, on urging to press the sealing sleeve against the cable. The sealing sleeve is bonded to a stiff slip ring.

15 Claims, 3 Drawing Sheets

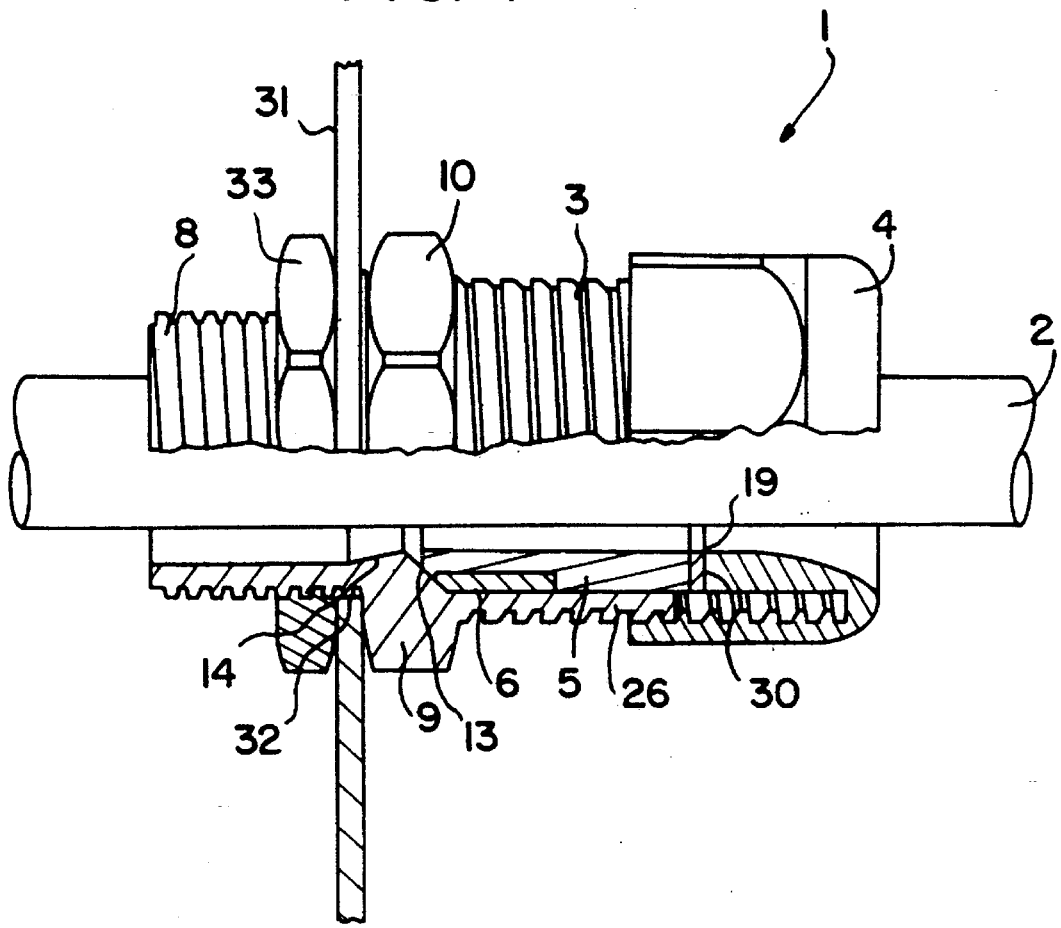
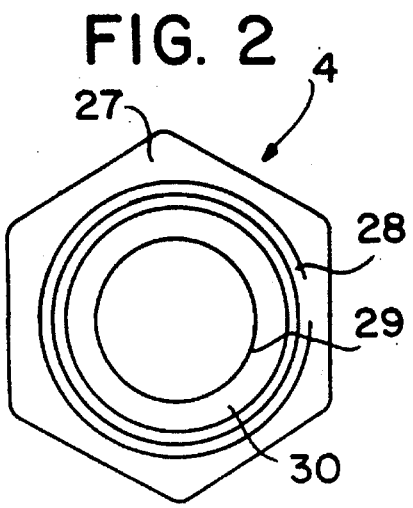
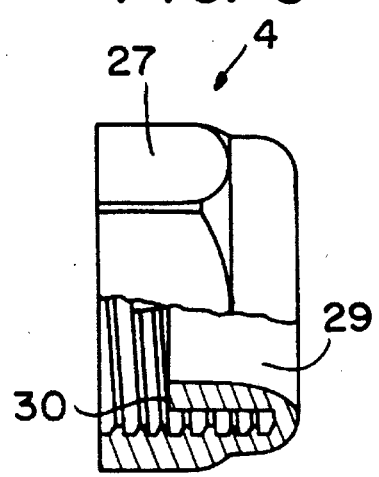

FIXING DEVICE TO ANCHOR AND SEAL AN ELONGATE MEMBER

This invention relates to a fixing device for a cable, tube or similar flexible or rigid filamentary product and, more particularly, to a fixing device of the kind which both anchors and seals around the filamentary product, and which does not require disassembly before the filamentary product is introduced for this purpose.

BACKGROUND ART

There are a number of fixing devices of the type or kind identified above which are known in the prior art. See, for example, those described in U.S. Pat. Nos. 3,055,972, 4,145,075, 4,371,173 and 4,513,172, and in French patent specification 2517132 A1.

Ideally, a fixing device of the subject type should be capable of performing substantially all of the following tasks to a generally satisfactory degree:

securely anchor the filamentary product in such a manner that where the product is flexible and has a core susceptable to damage no damage is sustained.

provide a seal around the circumference of the filamentary product capable of withstanding a significant pressure differential.

anchor and seal around a range of different cross-sectional shapes and sizes of filamentary products.

where the filamentary product is flexible, provide a kink protector to prevent damage to the product.

None of the prior art fixing devices adequately perform the above identified functions.

In this regard, fixing devices of the prior art have generally either compromised universality—the ability to anchor and seal around a range of different cross-sectional shapes and sizes of filamentary products—or sealing and anchoring performance.

Another common failing is that to achieve the required anchoring effect in many prior art fixing devices a tough plastics component is caused to bite into the filamentary product, causing high load pressure which, where the product is, for example, a sheathed electrical cable, can result in damage to the conductors. This may then produce short circuits and a risk of electrocution. This problem is exacerbated where no kink protector is provided leading out from the anchoring point and the free end of the electrical cable is subject to movement.

It is an object of the present invention to at least go some way towards overcoming the above noted difficencies of the prior art, moving closer towards the above outlined ideal.

SUMMARY OF THE INVENTION

In a broad aspect of this invention there is provided a fixing device for anchoring and sealing around a filamentary product, the device comprising a body, an annular cap, a clamping ring and an elastomeric sealing sleeve, wherein:

the body has a central bore extending through its entire length, and a screw threaded end portion;

the annular cap includes an urging means and is threadably mountable on the screw threaded end portion of the body;

the clamping ring includes an annular base member upstanding from which extend a plurality of spaced apart gripping fingers; and the sealing sleeve is adapted to be slidably received within the annulus of gripping fingers of the clamping ring but extending beyond the tips thereof;

characterised in that the clamping ring is adapted to be received within the bore of the body such that the free ends of the gripping fingers are slidably engageable with an inwardly tapered portion of the bore, and the urging means of the annular cap can act directly or indirectly on the annular base member of the clamping ring to urge the free ends of the gripping fingers into the tapered portion of the bore, the free ends of the gripping fingers being configured and arranged on such urging to press the sealing sleeve against the filamentary product, thereby anchoring it in position and sealing around it, the sealing sleeve being substantially prevented from extruding passed the gripping fingers or passed the urging means.

"Filamentary product", as used in the context of this patent specification, is intended to include flexible and rigid sheathed electrical or other cabling, and flexible or rigid bars, tubes, hoses or like products.

Conveniently, the gripping fingers can slidably overlap in fan-like formation to press the sealing device against the filamentary product.

An advantage of the fixing device of the present invention is that, as any pressure differential acting across it will produce a resultant pressure from the annular cap side, the sealing sleeve is unable to extrude passed the fingers of the clamping ring. In this connection, any pressure will serve only to increase the seal integrity as the sealing sleeve is forced deeper into the tapered space created between the tips of the gripping fingers and the filamentary product.

Preferably in from the inwardly tapered portion of the bore in the body the bore increases in diameter again.

Desirably, the fingers of the clamping ring are sufficiently resilient for their tips to curl outwardly should they project into the bore of the body beyond the edge of the tapered portion to the point where the bore diameter increases again.

Conveniently, the annular cap may incorporate a kink protector.

Preferably the sealing sleeve is an integral extension of a tubular clamping gasket having a groove circumscribing its exterior surface to facilitate collapsing of the gasket in a bellows type configuration under compression, thereby gripping and sealing around the filamentary product.

Advantageously a stiff slip ring, adapted to be slidably engageable with the urging means of the annular cap, may be bonded to the free end of the tubular clamping gasket.

In a further broad aspect of this invention there is provided a fixing device for anchoring a filamentary product, the device comprising a body, having a bore centrally extending the length thereof and a screw-threaded end portion, at least one clamping gasket loctable within the bore which can be pressed against the outer surface of the filamentary product, and an annular cap engageable with the threaded end portion of the body to press the clamping gasket against the filamentary product and thereby anchor it in position, the clamping gasket comprising an elastomeric portion, adapted to be pressed against the filamentary product, bonded to a stiff slip ring adapted to be slidably engageable with the annular cap.

BRIEF DESCRIPTION OF THE DRAWINGS

A presently preferred embodiment of the invention will now be described, by way of example only, with reference to the accompanying drawings, in which:

FIG. 1 illustrates a partially sectioned side elevation of a fixing device in accordance with the present invention in an unclamped state;

FIG. 2 illustrates an end elevation of the annular end cap of the fixing device of FIG. 1;

FIG. 3 illustrates a partially sectioned side elevation of the annular end cap of FIG. 2;

Figure 4:
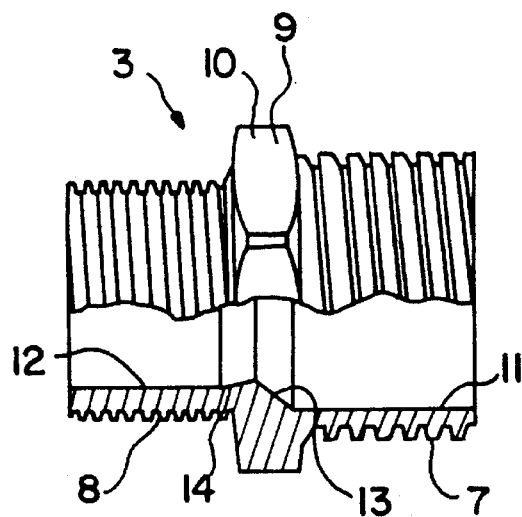
FIG. 4 illustrates a partially sectioned side elevation of the body of the fixing device of FIG. 1.
Figure 5:
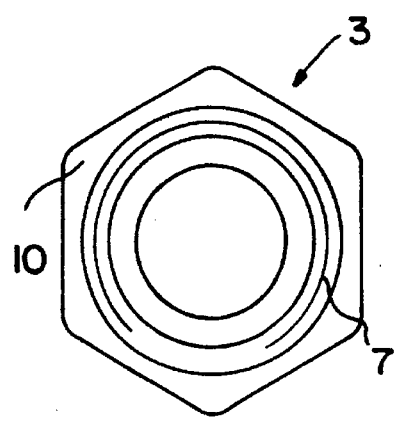
FIG. 5 illustrates an end elevation of the body of FIG. 4.
Figure 6:
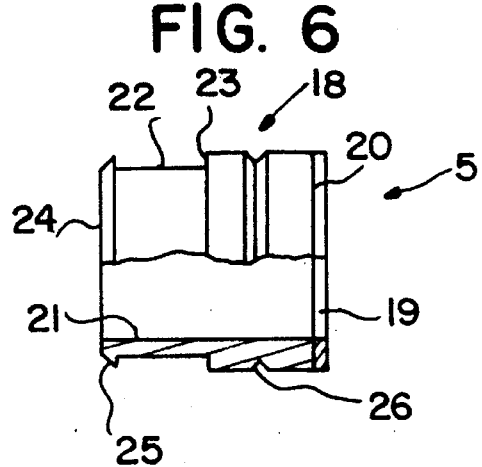
FIG. 6 illustrates a partially sectioned side elevation of the clamping gasket of the device of FIG. 1.
Figure 7:
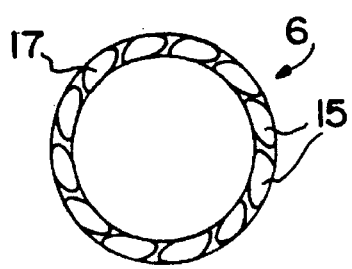
FIG. 7 illustrates an end elevation of the clamping ring of the fixing device of FIG. 1.
Figure 8:
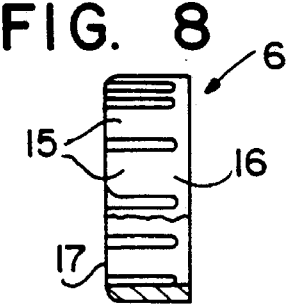
FIG. 8 illustrates a partially sectioned side elevation of the clamping ring of FIG. 7.
Figure 9:
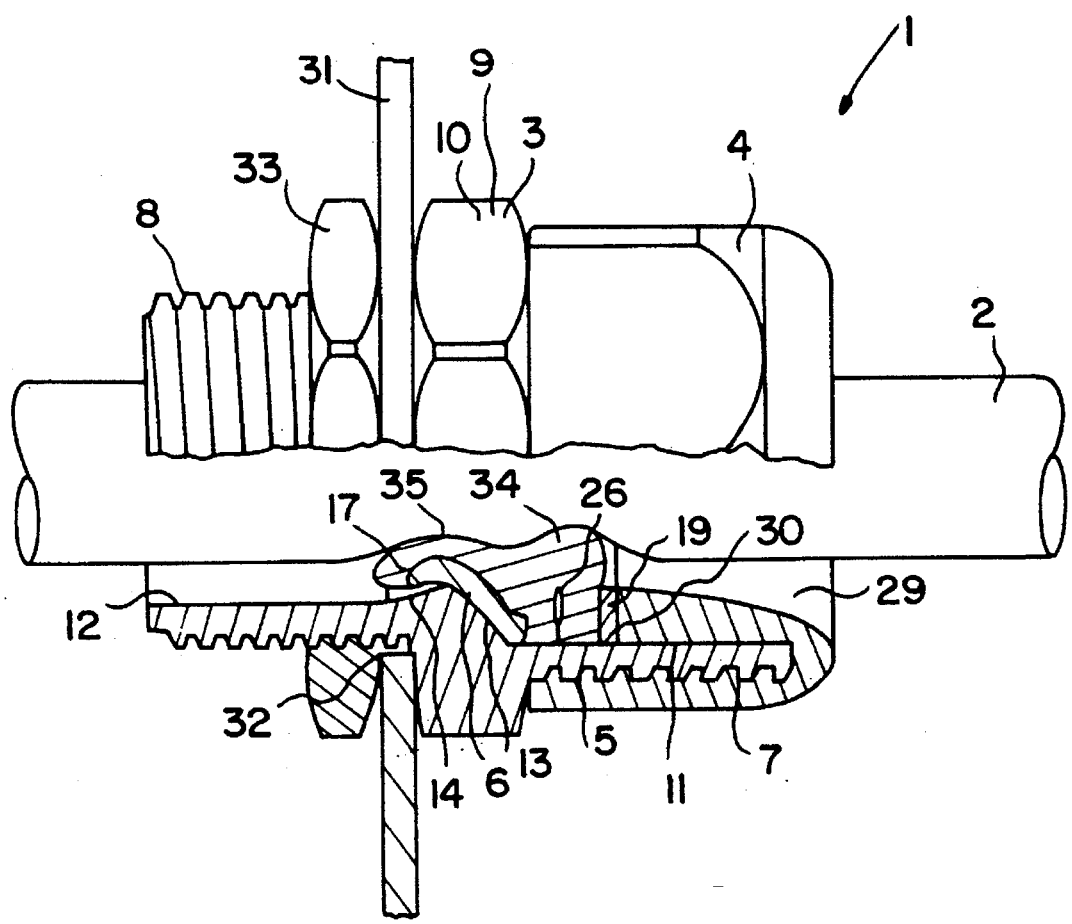
FIG. 9 illustrates a partially sectioned side elevation of the fixing device of FIG. 1 in the fully clamped state.

As shown in the drawings, there is provided a device, as generally indicated at 1, for anchoring, or as is often termed, providing strain relief to and sealing around a cable 2, comprising a body 3, an annular end cap 4, a clamping gasket 5, and a clamping ring 6.

The body 3 has first and second end portions 7,8 respectively, and a central portion 9. Externally the body 3 is screw-threaded over each of the end portions 7,8 and the central portion 9 is formed as a hexagonal collar 10 adapted to be engaged with a spanner, wrench or like tool. Interior of the body 3 each of the end portions 7,8 is provided with a bore 11,12 respectively, having parallel sides. The central portion 9 is tapered having a largest diameter identical to that of the bore 11 and a smallest diameter smaller than that of the bore 12. In longitudinal cross-section the internal shape of the body 3 traverses, from the end of the end portion 7 to the end of the end portion 8, a first level extending to the beginning of the central portion 9, then upwardly or inwardly, over a ramped section 13, onward to an outwardly and downwardly ramped section 14, then to the beginning of the end portion 8 from where a second level extends to the end.

The clamping ring 6 comprises an annulus of spaced apart longitudinally extending resilient fingers 15 interconnected at one end about an annular base ring 16. Although spaced apart, the fingers 15 overlap and are configured and arranged so that when their ends 17 are pressed radially inwardly they gradually move together in sliding engagement to create a fan-shaped formation.

The clamping gasket 5 comprises two portions; a main portion 18 formed from an elastomeric material, and which is generally tubular in shape, and a stiff slip ring 19 bonded to an end 20 thereof. The clamping gasket 5 is shaped to be inserted into the bore 11 of the body 3, with the slip ring 19 towards the end 7.

The interior surface 21 of the main portion 18 of the gasket 5 is cylindrical in shape and is generally of the same dimension as the inner diameter of the slip ring 19.

The exterior surface 22, which is also generally cylindrical, steps down in diameter approximately midway along its length to provide a shoulder 23 against which the annular base ring 16 of the clamping ring 6 can be located. The reduced diameter extends from the shoulder 23 almost to the other end 24 at which point a radially outwardly .extending lip 25 is provided. The distance between the lip 25 and the shoulder 23 being approximately equal to the length of the clamping ring 6, which ring 6 can be slidably engaged with the gasket 5 and retained in position by the shoulder 23 and lip 25. The remaining part of the clamping gasket 5, between the shoulder 23 and the end 20, is of increased diameter, similar in dimension to the exterior diameter of the slip ring 19 and the bore 11 of the body 3. Approximately midway between the shoulder 23 and the end 20 there is provided a V-shaped groove 26 which circumscribes the exterior of the clamping gasket 5 at this point. The groove 26 penetrates to approximately half the depth of the wall thickness of the clamping gasket 5.

The final component is the annular end cap 4. The cap 4 includes a hexagonal collar 27, adapted to be engageable with a spanner, wrench or like tool, having an internal screw-thread 28 by which the cap 4 can be screwed onto the thread of the end portion 7 of the body 3. From one end of the collar 27 the cap 4 curves radially inwardly, extending over and back on itself to form an annular section 29 concentric with the collar 27 and having a maximum diameter less than, or almost equal to the bore 11 of the body 3. Section 29 has an annular pressing end 30 which is adapted to bear against the slip ring 19.

Prior to clamping around the cable 2 the device 1 may be stored in its assembled state; the clamping mounting ring 6 mounted on the gasket 5 between the lip 25 and the shoulder 23, the gasket 5 positioned in the bore 11 of the body 3 with the slip ring 19 adjacent the end of the end portion 7, and the annular end 30 of the annular end cap 4 retaining the gasket 5 in that position by being loosely screwed onto the thread of the end portion 7.

To mount the device 1 on the wall 31 of a housing an aperture 32 through the wall 31 must first be created. Next the end portion 8 of the body 3 may be inserted through the aperture 32 and a locating nut 33 screwed onto the threaded end portion 8 to clamp the wall 31 between the locating nut 33 and the hexagonal collar 10 of the central portion 9 of the body 3. Additional washers/gaskets etc may be used as required.

With the device 1 mounted in position and in an assembled state an end of the cable 2 can be slipped through the body 3 into the housing. To anchor the cable 2 in position the cap 4 is screwed down further onto the threaded end portion 7. When this happens the annular end 30 of the cap 4 presses against the slip ring 19, forcing it in the direction of the ramped section 13. The main portion 18 of the gasket 5 is then slowly compressed between the ramped section 13 and the slip ring 19.

As the cap 4 is tightened down further the V-shaped groove 26 in the main portion 18 of the gasket 5 allows that portion 18 to bellow inwards, thereby shortening the gasket 5 in the longitudinal direction, but generating a local annular bulge 34 on the interior surface 21. The bulge 34 presses against and into the cable 2. With the slip ring 19 bonded to the main portion 18 of the gasket 5 only minimal extrusion of the material of the main portion 18 back between the cable 2 and the slip ring 19 is possible, thus the anchoring force on the cable 2 at the bulge 34 is maximised.

In addition, as the gasket 5 is compressed the shoulder 23 urges the clamping ring 6 up the ramped section 13. As it moves the fingers 15 of the clamping ring 6 slidably engage and overlap in fan-like formation, in doing so the thickness of the annulus of the fingers 15 increases. Moreover, the lip 25 on the main portion 18 of the gasket 5 is also carried up the ramped section 13 by the fingers 15. The combination of overlapping fingers 15 and the gasket 5 carried therewith together generate a further annular bulge 35 which compresses around the cable 2.

Thus, the cable 2 is anchored in two separate locations by the bulges 34 and 35 each of which provides both strain relief and sealing. The degree of force exerted on the cable 2 by the bulges 34 and 35 and there thus the strain relief and integrity of seal can be varied depending on how tightly the cap 4 is turned down.

As the free ends 17 of the fingers 15 of the clamping ring 6 extend towards the end portion 8 across the ramped section 14 the resilient nature of the lip 25 and adjacent parts of the gasket 5 cause the tips of the fingers 15 to curl back, (ie radially outwardly) thereby effectively locking the clamping ring 6 and gasket 5 in position between the bores 11,12.

It will readily be apparent that there are various features of the preferred embodiment described which each provide significant advantages over the prior art. In this connection, bonding the slip ring 19 to the main portion 18 of the gasket 5 effectively retains the main portion 18 in position, even under significant compressive stress and prevents any possibility of the material of the main portion 18 extruding back passed the slip ring 19, thereby ensuring maximum advantage is achieved.

Following on from that, the gasket 5 is self-restricting at its forward or clamping ring 6 end, as the overlapping fingers 15 compress around it and the cable 2. Thus, any pressure on the gasket 5 drives it deeper into the tapered space between fingers 15 and the cable 2, resulting in even better sealing performance.

Further, having the clamping ring 6 separate from the body 3, and being backwardly facing, ie the free ends 17 of the fingers 15 being directed towards the end portion 8, enables the cap 4 to function also as a kink protector, as the cable 2 is held further back in the body of the clamping device 1, thereby providing a compact overall unit. Indeed, it has been noted that the cap 4 can provide a kink protector which satisfies the requirements of EExe minimum radius of curvature of cables.

Still further, because the gasket 5 is always between the free ends 17 of the fingers 15 of the clamping ring 6 and the cable 2, there is never any danger of the fingers 15, which should be reasonably stiff but resilient, from digging into and through the sheath of the cable 2, thereby potentially causing damage.

Finally, a significant advantage is provided by the double strain relief and high quality seal, which, it has been found, is liquid and gas tight, generated by the combination of the action of the clamping ring 6 and bellows type arrangement formed by the V-shaped groove 26.

The above described preferred embodiment, having the body 3 formed from UV stabilised black nylon, has an operational temperature range of –40° C. to 100° C. Moreover, the relevant product specifications of BS 6121 are met, and in many cases exceeded. For example, an M16 size fixing device is capable of adequately anchoring and sealing around circular cross-section cables of diameter range 4 mm–9 mm (±2.5 mm); the standard requirement is 4 mm–8 mm (±2.0 mm). Further, the preferred embodiment has been tested to IP 68 on round cable to a 10 Bar pressure differential, or the equivalent. Furthermore, the preferred embodiment has been shown to seal on and anchor oval, surface damaged, distorted, twisted and flat TPS cable. Sealing on TPS cable has been tested to IP 68 at 2 meters submersion, with no loss of seal integrity.

Various modifications to the above described embodiment are envisaged, for example the main portion 18 of the gasket 5 may be impregnated with sand or grit to enhance anchoring ability with respect to the cable 2.

Additional advantages of the present invention will become apparent to those skilled in the art after considering the principles in particular form as discussed and illustrated.

Accordingly, it will be appreciated that changes other than those noted above may be made to the above described embodiment of the invention without departing from the principles taught herein.

Finally, it will be understood that this invention is not limited to the particular embodiment described or illustrated, but is intended to cover all alterations, additions or modifications which are within the scope of the appended claims.

I claim:

1. A fixing device for anchoring and sealing around a filamentary product, the device comprising a body, an annular cap, a clamping ring and an elastomeric sealing sleeve, wherein:

the body has a central bore extending through its entire length in a longitudinal direction, and a screw threaded end portion;

the annular cap includes an urging means and is threadably mountable on the screw threaded end portion of the body;

the clamping ring includes an annular base member upstanding from which extend a plurality of spaced apart gripping fingers; and, the sealing sleeve is adapted to be slidably received within the annulus of the gripping fingers of the clamping ring but extending in the longitudinal direction beyond the tips thereof;

characterised in that the clamping ring is adapted to be received within the bore of the body such that the free ends of the gripping fingers are slidably engageable with an inwardly tapered portion of the bore, and the urging means of the annular cap can act directly or indirectly on the annular base member of the clamping ring to urge the free ends of the gripping fingers into the tapered portion of the bore, the free ends of the gripping fingers being configured and arranged on such urging to press the sealing sleeve inwardly to define a first annular gripping surface bearing against the filamentary product, thereby anchoring it in position and sealing around it, the sealing sleeve being substantially prevented from extruding past the gripping fingers or past the urging means and being arranged such that on partial collapsing under pressure exerted by said urging means a second annular gripping surface is formed in a longitudinally spaced relationship to said first annular gripping surface for additional sealing and anchoring engagement with the filamentary product.

2. A fixing device according to claim 1, wherein the gripping fingers can slidably overlap in fan-like configuration to press the sealing sleeve against the filamentary product.

3. A fixing device according to claims 1 or 2, such that beyond the inwardly tapered portion of the bore in the body the bore increases in diameter again.

4. A fixing device according to claim 2, wherein the fingers of the clamping ring are sufficiently resilient for their tips to curl outwardly should they project into the bore of the body beyond an edge of the tapered portion to a point where the bore diameter increases again.

5. A fixing device according to claim 1, wherein said gripping fingers extend away from said annular cap, for preventing kinks in said filamentary product.

6. A fixing device according to claim 5, wherein a central bore of the annular cap flares outwardly thus providing kink protection.

7. A fixing device according to claim 5, wherein the annular cap has a central bore which flares outwardly, and the outward flare of the bore of the annular cap limits a minimum radius of curvature for electrical cables.

8. A fixing device according to claim 1, wherein the sealing sleeve is an integral extension of a tubular clamping gasket having a free end and a groove circumscribing its exterior surface to facilitate collapsing of the gasket in a bellows type configuration under compression in forming said second annular gripping surface for gripping and sealing around the filamentary product.

9. A fixing device according to claim 8, wherein a stiff slip ring, adapted to be slidably engageable with the urging means of the annular cap, is bonded to the free end of the tubular clamping gasket.

10. A fixing device according to claim 9, wherein, on compression of the sealing sleeve, an O-ring type seal is formed between the sealing sleeve and the filamentary product.

11. A fixing device according to claim 9, wherein the sealing sleeve is substantially captured between the gripping fingers of the clamping ring and the stiff slip ring, and thus is substantially prevented from extruding forward or backward in the longitudinal direction along the filamentary product.

12. A fixing device according to claim 1, wherein the filamentary product is an electrical cable.

13. A fixing device according to claim 11, wherein the filamentary product is of circular or oval cross-section.

14. A fixing device according to claim 12, wherein the electrical cable is circular, flat TPS, twisted or oval in cross-section, or is surface damaged or distorted.

15. A fixing device according to claim 11 which is sized for a designated electrical cable diameter and can accommodate diameter variations ranging from −2.5 to +2.5 millimeters of said designated electrical cable diameter.

* * * * *